(12) United States Patent
Kozaczuk et al.

(10) Patent No.: US 10,078,481 B2
(45) Date of Patent: Sep. 18, 2018

(54) SECONDARY DISPLAY MECHANISM (71) Applicants: INTEL CORPORATION, Santa Clara, CA (US); Anthony Kozaczuk, Burlingame, CA (US); James Trethewey, Hillsboro, OR (US); Greg Kaine, Santa Clara, CA (US); Murali Veeramoney, Beaverton, OR (US); Karen Stafford, Gilbert, AZ (US)

(72) Inventors: Anthony Kozaczuk, Burlingame, CA (US); James Trethewey, Hillsboro, OR (US); Greg Kaine, Santa Clara, CA (US); Murali Veeramoney, Beaverton, OR (US); Karen Stafford, Gilbert, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 214 days.

(21) Appl. No.: 14/406,446

(22) PCT Filed: Jan. 29, 2014

(86) PCT No.: PCT/US2014/013499
§ 371 (c)(1),
(2) Date: Dec. 8, 2014

(87) PCT Pub. No.: WO2015/116046
PCT Pub. Date: Aug. 6, 2015

(65) Prior Publication Data
US 2016/0274853 A1 Sep. 22, 2016

(51) Int. Cl.
*G06F 3/14* (2006.01)
*G06F 1/16* (2006.01)
(Continued)

(52) U.S. Cl.
CPC .......... *G06F 3/1423* (2013.01); *G06F 1/1654* (2013.01); *G06F 3/0412* (2013.01);
(Continued)

(58) Field of Classification Search
CPC .... G06F 3/1423; G06F 1/1654; G06F 3/0412; G06F 3/0482; G09G 2360/02
See application file for complete search history.

(56) References Cited

U.S. PATENT DOCUMENTS 8,832,193 B1 * 9/2014 Lindberg ................ H04L 65/60
348/14.12
2007/0136337 A1 * 6/2007 Sah ...................... G06F 17/3089
(Continued)

FOREIGN PATENT DOCUMENTS

JP  2002-108267  4/2002
JP  2004-272481  9/2004
(Continued)

OTHER PUBLICATIONS

International Preliminary Report on Patentability, PCT/US2014/013499, 8 pages, dated Aug. 11, 2016.
(Continued)

*Primary Examiner* — Abbas Abdulselam
(74) *Attorney, Agent, or Firm* — Womble Bond Dickinson (US) LLP (57) ABSTRACT

A computing device is described. The computing device a processor, a bus coupled to the processor, a graphics display device, coupled to the bus, to display graphics data, an interactive display device, coupled to the bus, to display bitmap image data and a manager module to manage the bitmap image data and transmit the bitmap image data to the interactive display device.

23 Claims, 8 Drawing Sheets

(51) Int. Cl.
*G06F 3/041* (2006.01)
*G06F 3/0482* (2013.01)
*G09G 5/14* (2006.01)
*G09G 3/34* (2006.01)

(52) U.S. Cl.
CPC .............. *G06F 3/0482* (2013.01); *G06F 3/14* (2013.01); *G09G 5/14* (2013.01); *G09G 3/344* (2013.01); *G09G 2340/0407* (2013.01); *G09G 2354/00* (2013.01); *G09G 2358/00* (2013.01)

(56) References Cited

U.S. PATENT DOCUMENTS

| | | | |
|---|---|---|---|
| 2007/0174414 A1* | 7/2007 | Song | H04L 67/34 709/217 |
| 2008/0247128 A1 | 10/2008 | Khoo | |
| 2010/0033916 A1 | 2/2010 | Douglas et al. | |
| 2010/0201878 A1 | 8/2010 | Barenbrug et al. | |
| 2011/0066971 A1 | 3/2011 | Forutanpour et al. | |
| 2011/0191478 A1 | 8/2011 | Eischeid et al. | |
| 2012/0092305 A1* | 4/2012 | Barnes | G09G 5/391 345/204 |
| 2012/0169754 A1 | 7/2012 | Pesonen et al. | |
| 2012/0194448 A1 | 8/2012 | Rothkopf | |
| 2012/0218191 A1 | 8/2012 | Huang et al. | |
| 2012/0256929 A1 | 10/2012 | Koenig et al. | |
| 2013/0102372 A1* | 4/2013 | Lutnick | G07F 17/3293 463/13 |
| 2013/0128050 A1* | 5/2013 | Aghdasi | H04N 7/181 348/158 |
| 2013/0295962 A1* | 11/2013 | Manroa | H04W 4/02 455/456.3 |
| 2014/0195811 A1* | 7/2014 | Braams | H04L 9/3247 713/176 |
| 2014/0196058 A1 | 7/2014 | Polivy et al. | |
| 2014/0280493 A1* | 9/2014 | Ortiz Rodriguez | G06F 15/167 709/203 |

FOREIGN PATENT DOCUMENTS

| | | |
|---|---|---|
| JP | 2010-217497 | 9/2010 |
| KR | 20080037063 | 4/2008 |
| KR | 20120061965 | 6/2012 |
| KR | 20130108657 | 10/2013 |

OTHER PUBLICATIONS

PCT Search Report and Written Opinion, PCT/US2014/013499, dated Oct. 22, 2014, 12 pages.

Office Action dated Jun. 6, 2017 for Japanese Patent Application No. 2016-537442.

Office Action dated May 22, 2017 for Korean Patent Application No. 2016-7017013.

Notice of Allowance for Korean Patent Application No. 2016-7017013 dated Nov. 10, 2017, 4 pages.

* cited by examiner

SECONDARY DISPLAY MECHANISM

The present patent application is a U.S. National Phase Application under 35 U.S.C. 371 of International Application No. PCT/US2014/013499 filed Jan. 29, 2014, the contents of which are incorporated herein in their entirety by reference.

FIELD

Embodiments described herein generally relate to mobile computer systems. More particularly, embodiments relate to implementation of a secondary display device at a mobile computer system.

BACKGROUND

Current computer systems often implement auxiliary/secondary display devices. However, such systems suffer from a range of problems. For example, existing auxiliary displays are typically not sufficiently large to view or read displayed results, and may be difficult to view at a distance, at oblique angles, or in bright ambient lighting conditions (e.g., outdoors). Additionally, existing auxiliary displays lose displayed images when the computer system enters a sleep mode or turns off.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Throughout this document, terms like "logic", "component", "module", "framework", "engine", "store", or the like, may be referenced interchangeably and include, by way of example, software, hardware, and/or any combination of software and hardware, such as firmware.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
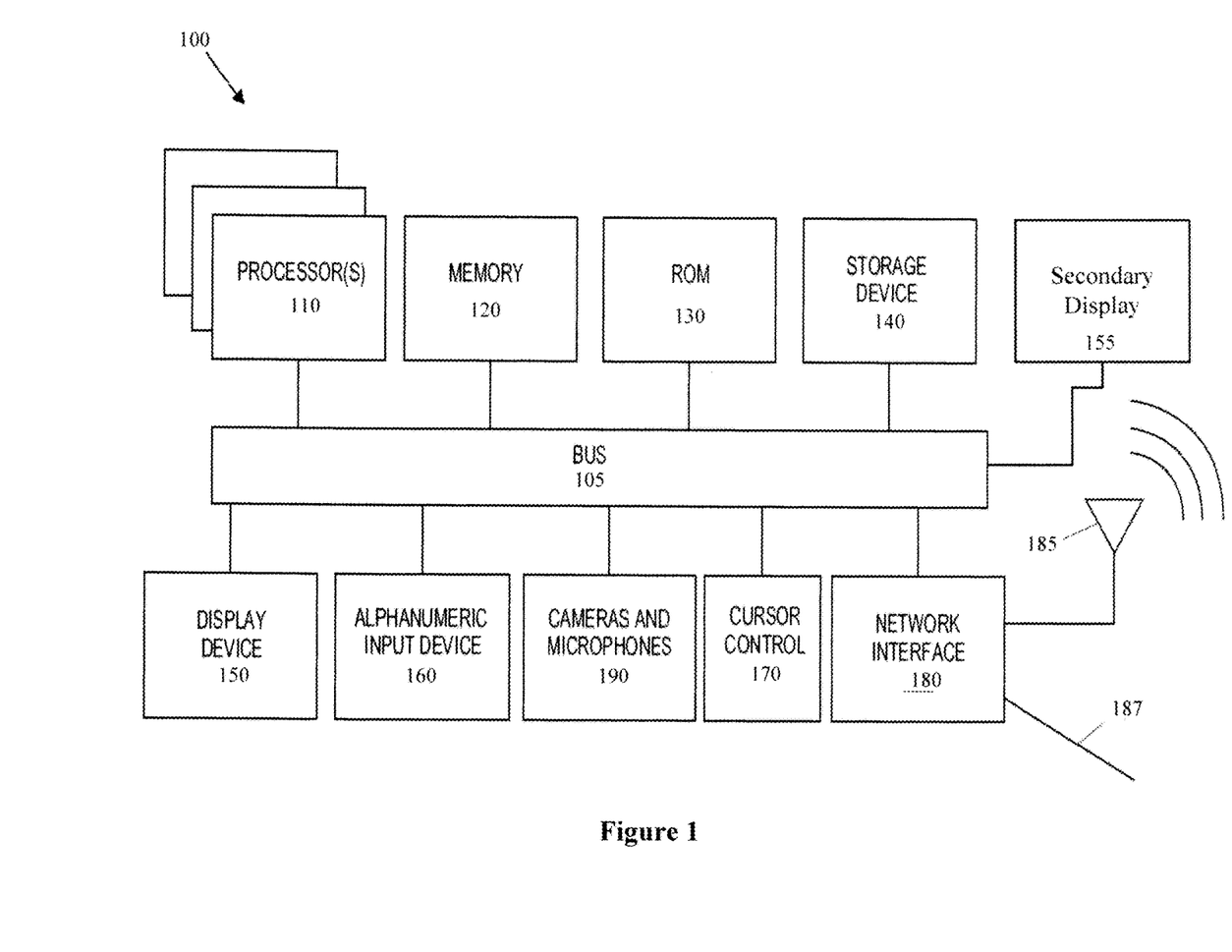
FIG. 1 is a block diagram illustrating one embodiment of a computer system.

FIG. 1 illustrates an embodiment of a computing system 100. Computing system 100 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components.

Computing system 100 includes bus 105 (or, for example, a link, an interconnect, or another type of communication device or interface to communicate information) and processor 110 coupled to bus 105 that may process information. While computing system 100 is illustrated with a single processor, electronic system 100 and may include multiple processors and/or co-processors, such as one or more of central processors, graphics processors, and physics processors, etc. Computing system 100 may further include random access memory (RAM) or other dynamic storage device 120 (referred to as main memory), coupled to bus 105 and may store information and instructions that may be executed by processor 110. Main memory 120 may also be used to store temporary variables or other intermediate information during execution of instructions by processor 110.

Computing system 100 may also include read only memory (ROM) and/or other storage device 130 coupled to bus 105 that may store static information and instructions for processor 110. Data storage device 140 may be coupled to bus 105 to store information and instructions. Data storage device 140, such as magnetic disk or optical disc and corresponding drive may be coupled to computing system 100.

Computing system 100 may also be coupled via bus 105 to display device 150, such as a cathode ray tube (CRT), liquid crystal display (LCD) or Organic Light Emitting Diode (OLED) array, to display information to a user. User input device 160, including alphanumeric and other keys, may be coupled to bus 105 to communicate information and command selections to processor 110. Another type of user input device 160 is cursor control 170, such as a mouse, a trackball, a touch screen, a touchpad, or cursor direction keys to communicate direction information and command selections to processor 110 and to control cursor movement on display 150. Camera and microphone arrays 190 of computer system 100 may be coupled to bus 105 to observe gestures, record audio and video and to receive and transmit visual and audio commands.

Computing system 100 may further include network interface(s) 180 to provide access to a network, such as a local area network (LAN), a wide area network (WAN), a metropolitan area network (MAN), a personal area network (PAN), Bluetooth, a cloud network, a mobile network (e.g., 3$^{rd}$ Generation (3G), etc.), an intranet, the Internet, etc. Network interface(s) 180 may include, for example, a wireless network interface having antenna 185, which may represent one or more antenna(e). Network interface(s) 180 may also include, for example, a wired network interface to communicate with remote devices via network cable 187, which may be, for example, an Ethernet cable, a coaxial cable, a fiber optic cable, a serial cable, or a parallel cable.

Network interface(s) 180 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 180 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 180 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

Figure 2A:
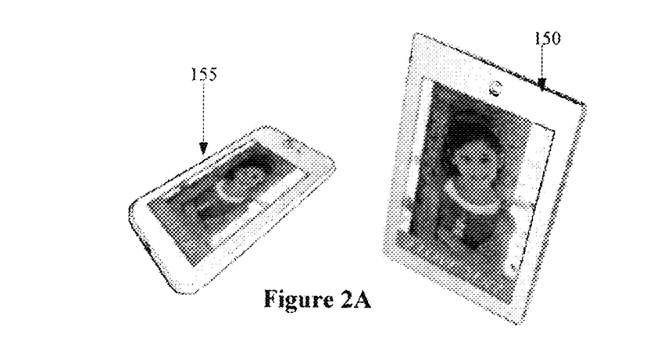
FIGS. 2A-2C illustrate embodiments of computer systems with a secondary display.
Figure 2B:
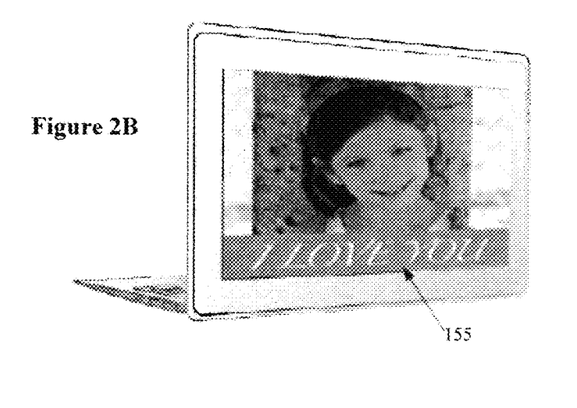
Figure 2C:
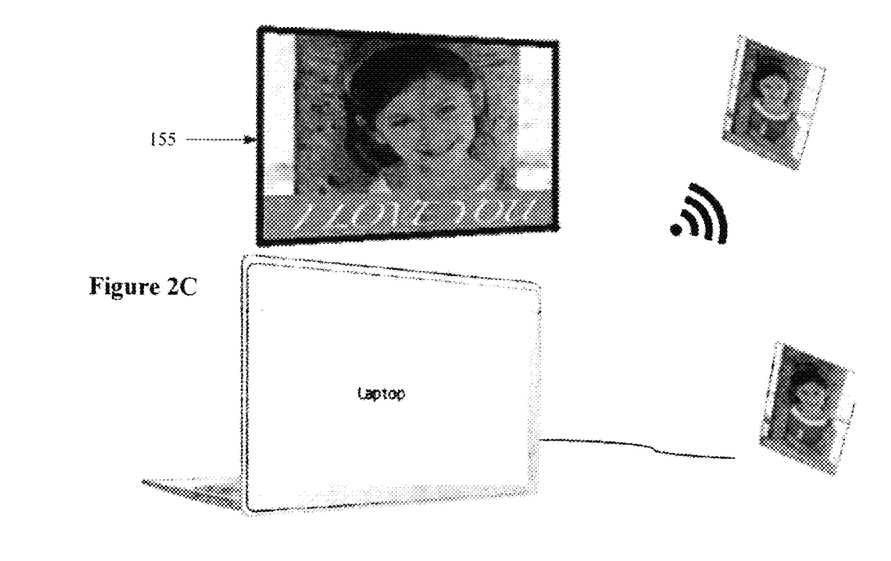

According to one embodiment, computer system 100 also includes a secondary display device 155 coupled to bus 105. In such an embodiment, secondary display 155 is a secondary persistent display (e.g. an Electronic Paper Display (EPD), such as E-Ink) added to an industrial design of a mobile device such as computer system 100. In a further embodiment, secondary display 155 is a limited interactive device interfaced via bus 105, rather than being a graphics device. FIGS. 2A-2C illustrate embodiments of computer systems with a secondary display.

For example, FIG. 2A illustrates one embodiment in which secondary display 155 implemented as a separate tablet from a tablet at which display device 150 is implemented. FIG. 2B illustrates one embodiment in which secondary display 155 is positioned on opposite side of a primary display device on a notebook computer system. In such an embodiment, secondary display 155 may be connected to the computer system via a wired connection (e.g., USB) or wireless (e.g., Bluetooth or wireless LAN).

Although shown on the outside of a notebook computer system lid, other embodiments may feature secondary display 155 located on the back of a clamshell/convertible phone. In a further embodiment, contents of secondary display 155 can be viewed by others when the lid is open (e.g., for social broadcasting usages) or used as an e-reader, for messages (e.g., alerts, etc.) when the lid is closed or in a tablet/phone mode.

FIG. 2C illustrates another embodiment in which secondary display 155 is positioned on opposite side of a primary display device on a notebook computer system. However in this embodiment, secondary display 155 may be a wrapper/cover of the notebook computer that mechanically slides on the cover and attaches mechanically to receive power and data. In further embodiment, secondary display 155 may have other configuration, such as located on a wearable device.

In yet another embodiment, the size of secondary display 155 mounted on a notebook computer system. For instance, secondary display 155 may be a 6 inch or 9 inch display. Additionally, secondary display 155 may be a 9.7 inch E-Ink cover that attaches to the notebook computer system. In the above-described embodiments, secondary display 155 is mechanically mounted in a manner that minimizes thickness, retains robustness (e.g., against breakage), and provides pleasant viewing for the user that reduces eye strain.

Figure 3:
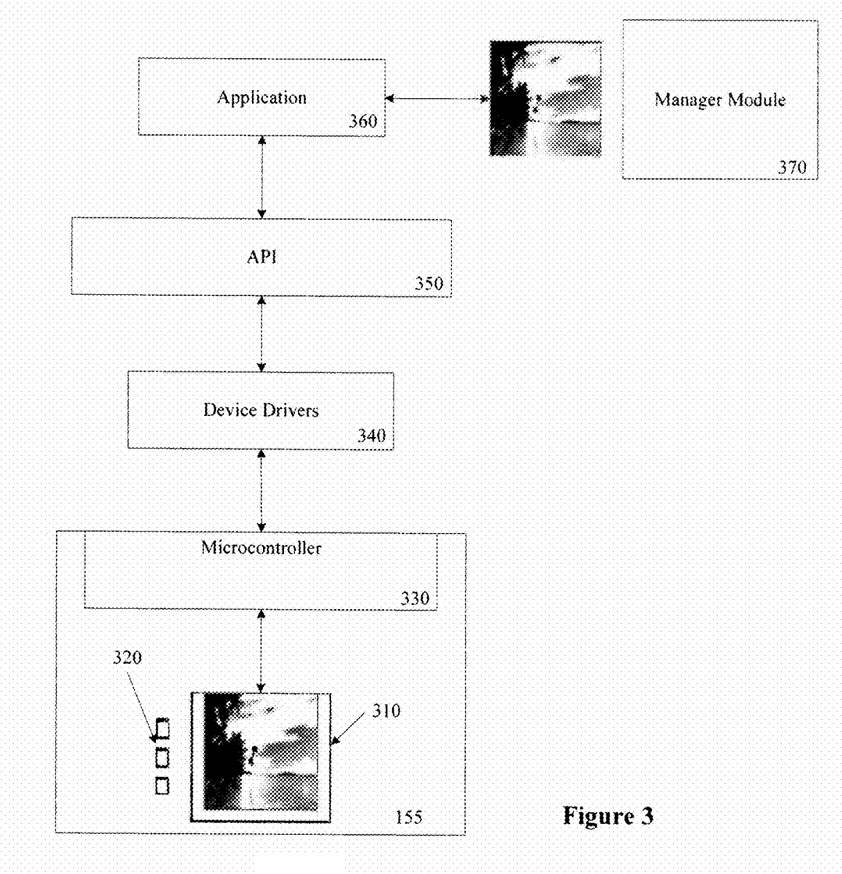
FIG. 3 a block diagram illustrating one embodiment of a secondary display architecture.

According to one embodiment, a user is permitted to select the contents of what is to be displayed on secondary display 155. In this embodiment, a user selects a bitmap image, which is transmitted to secondary display 155 in a manner similar to a print function. In such an embodiment, secondary display 155 includes a controller to receive the bitmap image and outputs the image to the display. FIG. 3 a block diagram illustrating one embodiment of a secondary display 155 architecture implemented to perform such a process.

As shown in FIG. 3, secondary display 155 includes display 310, buttons 320 and microcontroller 330. In one embodiment, display 310 is a touch screen which, when touched by a user, initiates an algorithm that routes finger-touch-coordinates to a particular application. In a further embodiment, display 310 includes an illumination mechanism (e.g., back-lighting, side-lighting, or front-lighting). In yet a further embodiment, content present on display 310 is persistent (e.g., does not require refresh cycles, such as E-Ink) on the screen even after power is removed from the mobile device. Thus, power is only consumed upon changing an image being displayed.

Buttons 320 may be momentary push-buttons or capacitive buttons that, when pressed by the user, initiates an algorithm that routes a button-input-status to particular application. Microcontroller 330 coordinates the display of content in the form of bitmap data at display 310. In one embodiment, microcontroller 330 facilitates the display of pop-up notifications at display 310 for alerts (e.g., new emails, missed phone calls, stock/news/weather/traffic updates, social network updates, etc.). In such an embodiment, a pop-up may automatically be dismissed (e.g., disappear) after a pre-defined time period, or in response to a user action (e.g., a button 320 press or touch screen touch).

In one embodiment, microcontroller 330 detects an event (e.g., touching at display 310 and/or buttons 320) and forwards the event to device drivers 340. Devices drivers 340 interface with microcontroller 330. Thus, device drivers 340 are aware of the attributes of display 310 (e.g., a hard configuration) in order to provide bitmap data in a human interface device (HID) compliant format specific to display 310. In one embodiment, the bitmap data is display independent.

Upon receiving an event, device drivers 340 forward the event to an application specific interface (API) 350 supported by the computer system 100 interface along with the display attributes. Further, API 350 receives raw bitmap data from an application program 360 in a display independent format. Application program 360 receives the display attributes from API 350 and in return, forwards a bitmap object to API 350 in an operating system format.

In operation, an application program 360 desires to prepare a bitmap image for display on an arbitrary sized secondary display 310. The application 360 does not, in advance, know the proper display attributes (e.g., resolution, color depth) of the types of bitmap images supported for rendering by display 310. The application 360 makes an operating system API 350 call to retrieve the display attributes, which are hard-configured in microcontroller firmware 330.

Once the application 360 knows the valid format, it prepares the bitmap image in its own local memory according to rules mandated by the operating system. If the original bitmap image comes from another (e.g., external) source and has different attributes (resolution, color depth) than the physical display 310, API 350 is implemented to condition (e.g., resize, dither) the image. Subsequently, API 350 makes an operating system API call to transfer the bitmap image in the operating system mandated object form down to device drivers 340. In one embodiment, the operating system API 350 used may be the Printer API, such that the secondary display appears to be a printer as far as the operating system and applications are concerned.

The secondary display device drivers 340 package the bitmap data into a bus-independent and display independent format and transmits the data over bus 105 to microcontroller 330. Upon receiving the data, microcontroller 330 unpacks the (HID formatted bitmap) data and renders it on display 310 according to the display 310 native electrical signaling requirements. Since display 310 is persistent the bitmap data can be streamed only once directly to the display panel. In one embodiment, microcontroller 330, device drivers 340 and/or application 360 may perform arithmetic algorithms on the bitmap data in order to improve appearance of the displayed image.

According to one embodiment, a manager module 370 is included to provide an easy-to-find boundary for all applications 360 that are secondary display aware. In such an embodiment, manager module 370 facilitates secure image posting to secondary display 310 by requiring that new applications 360 installed at computer system 100 register with manager module 370 in order to prevent malware from displaying unauthorized images. Thus, users may launch applications 360 from within manager module 370 upon approving or disapproving of an application 360 upon installation. Manager module 370 maintains a permission list of the approved/disapproved application 360 that is used to subsequently enforce the user's selected preferences.

Figure 4:
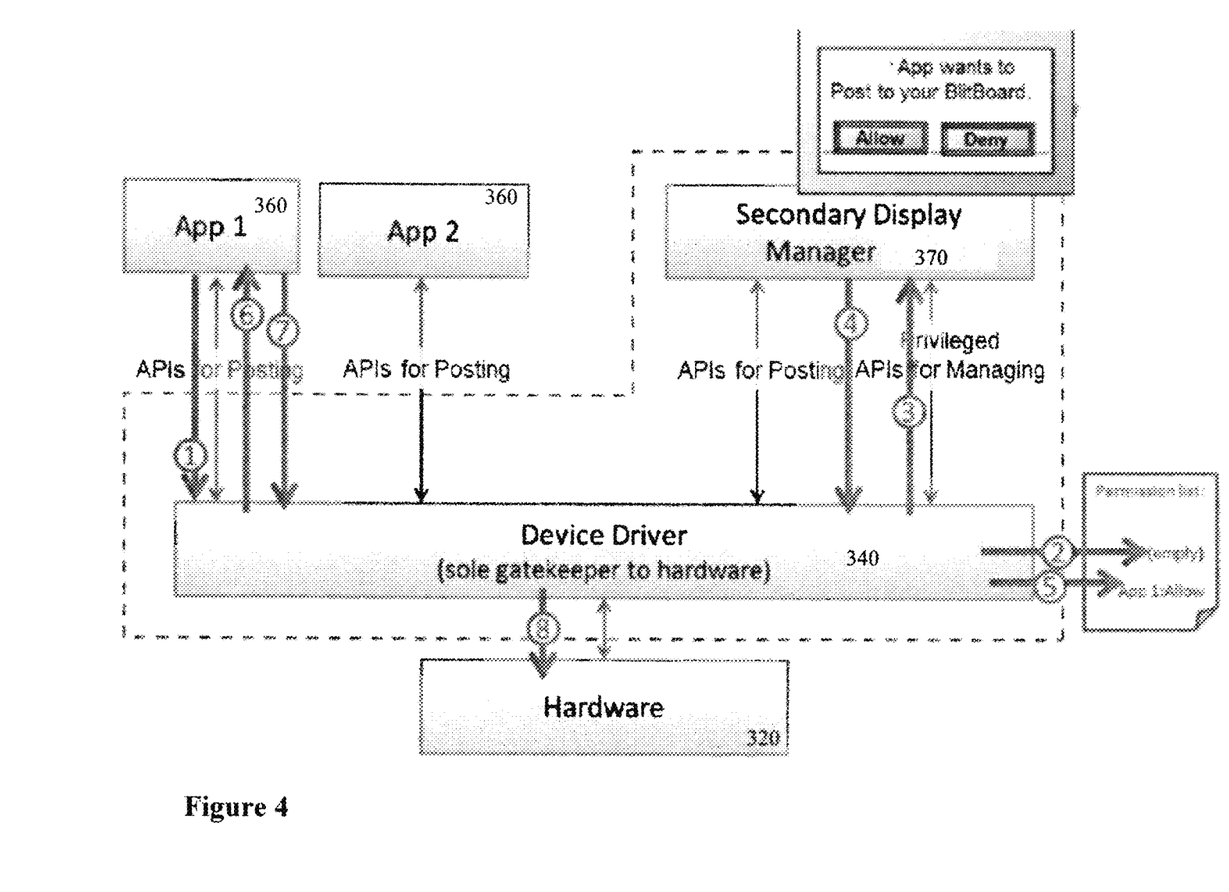
FIG. 4 illustrates one embodiment of a process for performing secure image posting.

FIG. 4 illustrates one embodiment of a process for performing secure image posting. Initially, a first application 360 (App 1) requests permission from device driver 340 for permission to post to secondary display 155. Subsequently, device driver 340 verifies that App 1 is on the permission list. Since App 1 is not currently on the list, device driver 340 requests permission from the user via manager module 370. Subsequently, manager module 370 displays a dialog box, via a graphical user interface (GUI), to receive an "Allow" or "Deny" answer from the user, which is forwarded to device driver 340. Device driver 340 stores the user-chosen permission for future reference. Device driver 340 then communicates the Allow/Deny answer to App 1. In this example, App 1 now has permission to post an image to display 310.

In one embodiment, manager module 370 maintains an exact copy of the image currently being displayed at display 310 to prevent a user from having to view display 310 to verify what is being displayed. Accordingly, the manager module 370 GUI enables the user to control images, if any, that are to be displayed at display 310. In a further embodiment, the manager module 370 GUI enables the user to control the brightness level of an illumination mechanism (e.g., front-lighting) of display 310, add, remove and/or move registered application 360 between the approved and disapproved list of applications. In a further embodiment, the GUI enables the user to designate (e.g., activate or deactivate) a specific image that will be displayed on the secondary display when the computer enters a low-power sleep state (e.g., S3/S4) or turns off (e.g., S5).

In one embodiment, manager module 370, via microcontroller 330, may be implemented to facilitate one or more regions of display 310 be sequestered from user control to permit a permanent image (e.g., OEM/company logo, platform logo content) be displayed. In a further embodiment, one or more regions of display 310 may be sequestered by the user to add locked content (e.g., not removable by a thief). Such a feature may be referred to as "Digital Engraving," which may include an owner's name, photo, phone number, and/or an "if lost return to" message. In yet a further embodiment, manager module 370 may communicate with an anti-theft subsystem (e.g., Intel Anti-Theft) to enable display of a message on display 310, in a secure manner that the thief cannot override, that computer system 100 has been stolen.

Figure 5:
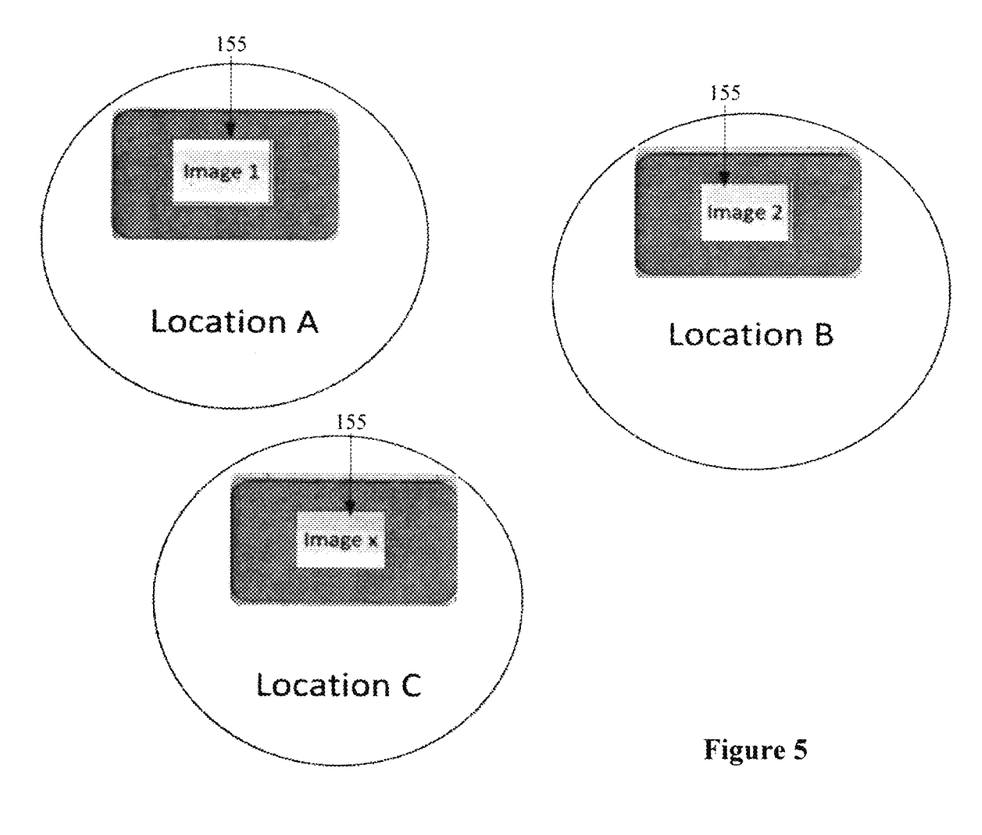
FIG. 5 illustrates one embodiment of a location based application for a secondary display.

According to one embodiment, manager module 370 may facilitate the display of images on secondary display 155 based on the geographical location of computer system 100. FIG. 5 illustrates one embodiment of such a location based application in which a first image (image 1) is displayed at secondary display 155 if computer system 100 is located at a first location (location A), a second image (image 2) is displayed at secondary display 155 if computer system 100 is located at a second location (location B) and a third image (image 3) is displayed at secondary display 155 if computer system 100 is located at a third location (location C).

Figure 6:
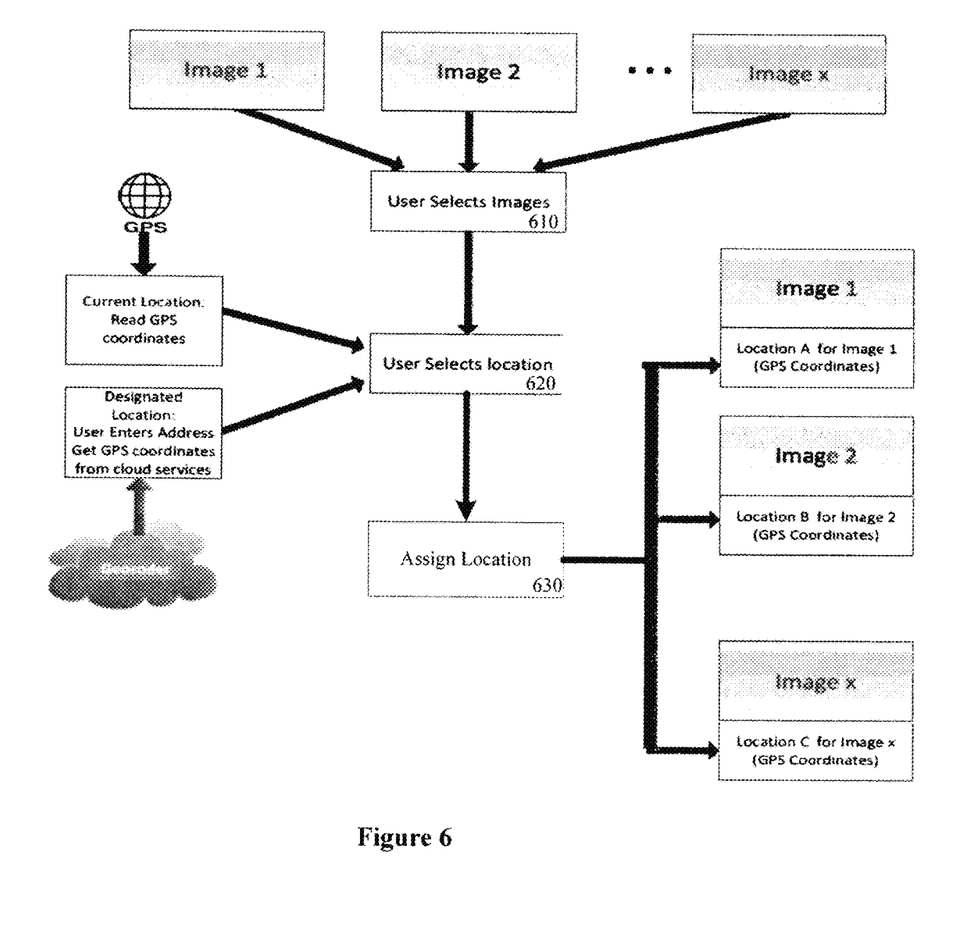
FIG. 6 is a flow diagram illustrating one embodiment of a process for tagging images based on location.

To perform location based image application, images are first tagged for display based on location. FIG. 6 is a flow diagram illustrating one embodiment of a process for tagging images based on location. At processing block 610, one or more images are selected by a user to be used. At processing block 620, a location is selected for association with each of the selected images. In one embodiment, the location can be either the current location or a designated location. If a current location is selected, a global positioning system (GPS) sensor at computer system is read to determine the current location. If a designated location is selected (e.g., based on a typed address), the GPS coordinates of the designated address is received (e.g., via a cloud service (e.g. Geocoder)). At processing block 630, the location is assigned to the one or more selected images. This process is repeated for each location at which a user wishes to tag images. In other embodiments, alternative forms of location determination may be used in lieu of a GPS sensor, including but not limited to: cellular network location determination, WiFi location determination, Bluetooth location determination, and so on.

Figure 7:
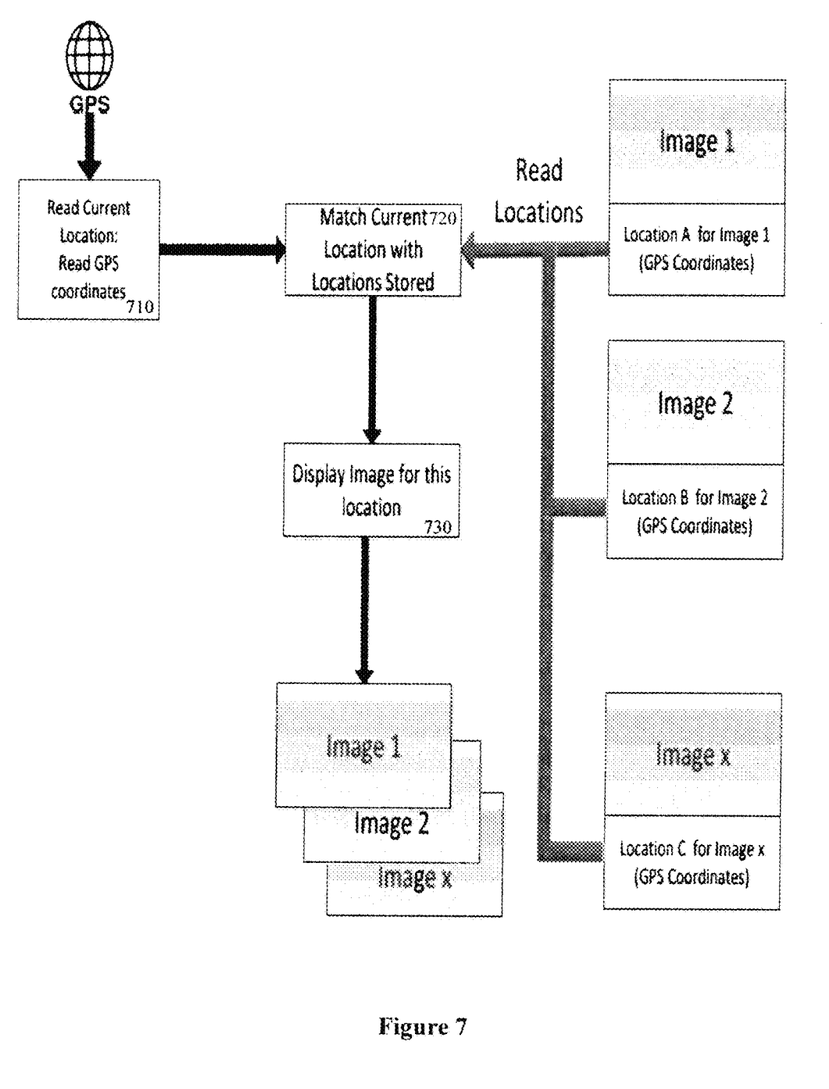
FIG. 7 is a flow diagram illustrating one embodiment of a process for displaying location based tagged images.

Once the tagging process has been completed, location based tagged images may be displayed at secondary display 155 upon feature enablement. FIG. 7 is a flow diagram illustrating one embodiment of a process for displaying location based tagged images. At processing block 710, the current location of computer system 100 is detected by reading the GPS sensor, or alternative form of location determination. At processing block 720, the current location is matched with a location stored during the tagging process. If a match is found, the one or more matched location tagged images manager module 370 displays the images on secondary display 155.

Figure 8A:
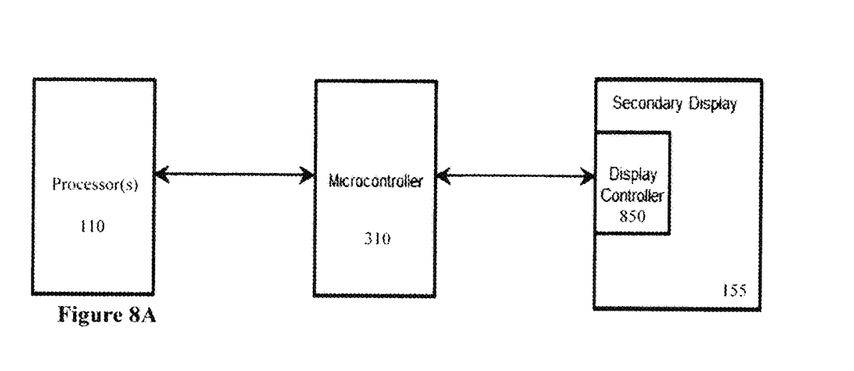
FIGS. 8A-8C illustrate alternative embodiments for implementing a secondary display microcontroller.
Figure 8B:
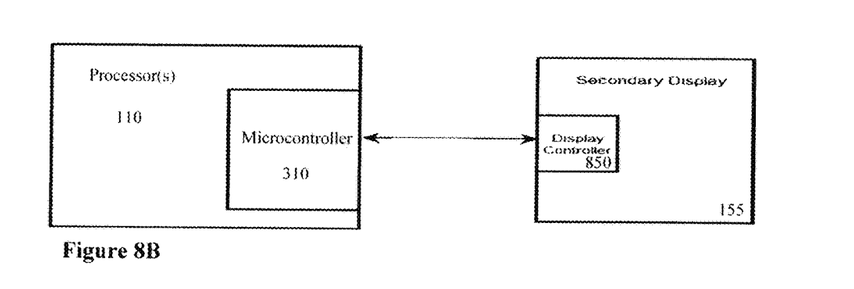
Figure 8C:
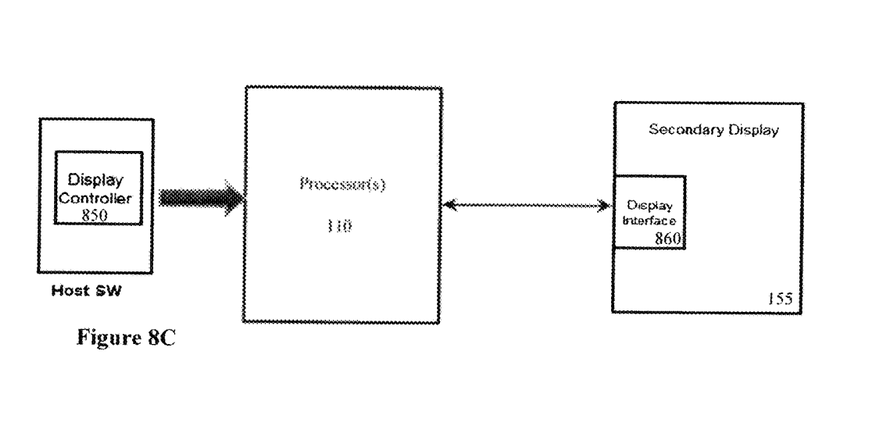

Although described above as being included within secondary display 155, microcontroller 330 may be incorporated within other computer system 100 architecture configurations. FIGS. 8A-8C illustrate alternative embodiments for implementing a secondary display microcontroller 330. FIG. 8A illustrates one embodiment in which microcontroller 330 is external and coupled between secondary display 155 and processor(s) 110. In such an embodiment, microcontroller 330 is used to abstract a display specific interface (e.g. display specific timing, protocols) from the operating system.

FIG. 8B illustrates an embodiment of a cost-optimized design in which microcontroller 330 is included within processor(s) 110 and coupled to secondary display 155. In other embodiments, microcontroller 330 may be an integrated engine such as the ISH (Integrated Sensor Hub) or CSME (Converged Security/Manageability Engine). In the embodiments described in FIGS. 8A and 8B secondary display 155 include a display controller 850 in addition to display 310. In such an embodiment, display controller 850 receives images, manipulates images, writes full or partial images to the panel and controls the display 310 pixels (e.g. panel source and gate control, display power control).

FIG. 8C illustrates another embodiment in which the display controller 850 function is performed by host software. In such an embodiment, the host software writes directly to secondary display 155 via bus 105. In this embodiment, no microcontroller 130 is implemented. Secondary display 155 includes a display interface 860 that converts bus 105 signals to panel specific interface (e.g., source and gate control, display power control) and display 310.

It is to be appreciated that a lesser or more equipped system than the example described above may be preferred for certain implementations. Therefore, the configuration of computing device 102 may vary from implementation to implementation depending upon numerous factors, such as price constraints, performance requirements, technological improvements, or other circumstances. Examples of the electronic device or computing device 102 may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating content-morphism and distribution of advertisement content and user content according to embodiments and examples described herein.

Some embodiments pertain to Example 1 that includes a computing device having a processor, a bus coupled to the processor, a graphics display device, coupled to the bus, to display graphics data, an interactive display device, coupled to the bus, to display bitmap image data and a manager module to manage the bitmap image data and transmit the bitmap image data to the interactive display device.

Example 2 includes the subject matter of Example 1 and wherein the interactive display device comprises a controller to receive the bitmap image data and a persistent display screen to display the bitmap image data.

Example 3 includes the subject matter of Example 2 and wherein the persistent display screen is a touch screen.

Example 4 includes the subject matter of Example 3 and wherein the interactive display device further comprises one or more buttons.

Example 5 includes the subject matter of Example 4 and wherein the controller detects an event upon activation of a button or the touch screen and transmits the event to the manager module.

Example 6 includes the subject matter of Example 1 and wherein the manager module manages requests from one or more applications to display data at the interactive display device.

Example 7 includes the subject matter of Example 6 and wherein the manager module comprises a graphical user interface to prompt and receive user interaction to approve the requests from the one or more applications to display data at the interactive display device.

Example 8 includes the subject matter of Example 7 and wherein the manager module further comprises a permission list of the applications approved and disapproved to display data at the interactive display device.

Example 9 includes the subject matter of Example 1 and further comprising a global positioning system (GPS) sensor to receive positioning data indicating a location of the computer system, wherein the manager module receives the positioning data and selects bitmap image data for display at the interactive display device based on a location indicated by the positioning data.

Example 10 includes the subject matter of Example 3 and wherein the interactive display device is an Electronic Paper Display (EPD).

Example 11 includes the subject matter of Example 3 and wherein the interactive display device is coupled to the bus via a wireless communications link.

Example 12 includes the subject matter of Example 3 and wherein the graphics display device is mounted on a front side of the computing system and the interactive display device is mounted on a backside of the computing device.

Example 13 includes the subject matter of Example 3 and wherein the interactive display device is located on a tablet device separate from the computing device.

Some embodiments pertain to Example 14 that includes a computer generated method for displaying data at a secondary display device comprising receiving display independent bitmap image data from an application, determining if the application is authorized to display data at an interactive display device, rendering the independent bitmap image data to device dependent bitmap image data if the application is authorized to display data at an interactive display device and displaying the device dependent bitmap image data at the interactive display device.

Example 15 includes the subject matter of Example 14 and wherein determining if the application is authorized to display data at the interactive display device comprises receiving a permission request from the application to display data at the interactive display device prior to receiving the display independent bitmap image data from an application and accessing a permission list to determine if the application has been approved to display data at an interactive display device.

Example 16 includes the subject matter of Example 15 and further comprising enabling the application to display data at the interactive display device if the application has been approved to display data at an interactive display device.

Example 17 includes the subject matter of Example 15 and further comprising displaying a prompt at the interactive display device for a user to select options to approve or disapprove the device if the application is not included on the permission list and communicating the option to the application.

Example 18 includes the subject matter of Example 14 and wherein the application is a location based application to display a first image at the interactive display device if a computer system is located at a first location and to display a second image at the interactive display device if computer system is located at a second location.

Example 19 includes the subject matter of Example 18 and wherein the location based application tags the first image to be associated with the first location and tags the second image to be associated with the second location.

Example 20 includes the subject matter of Example 19 and wherein tagging an image comprises selecting a location to be associated with the image.

Example 21 includes the subject matter of Example 20 and wherein the location is selected by designating global positioning system (GPS) coordinates of the first and second locations.

Example 22 includes the subject matter of Example 20 and wherein the location is selected by determining a location of the computer system during tagging of first image.

Example 23 includes the subject matter of Example 20 and wherein displaying an image at the interactive display device comprises detecting a current location of the computer system, matching the current location with a tagged location and displaying the tagged location.

Example 24 includes the subject matter of Example 20 and further comprising persistently displaying the data at the interactive display device.

Some embodiments pertain to Example 25 that includes a machine-readable medium comprising a plurality of instructions that in response to being executed on a computing device, causes the computing device to carry out operations according to any one of claims 14 to 24.

Some embodiments pertain to Example 26 that includes a system comprising a mechanism to carry out operations according to any one of claims 1 to 10.

Some embodiments pertain to Example 27 that includes a computing device arranged to carry out operations according to any one of claims 1 to 10.

Some embodiments pertain to Example 28 that includes a communications device arranged to carry out operations according to any one of claims 1 to 10.

Some embodiments pertain to Example 29 that includes a machine-readable medium comprising a plurality of instructions that in response to being executed on a computing device, causes the computing device to carry out operations comprising receiving display independent bitmap image data from an application, determining if the application is authorized to display data at an interactive display device, rendering the independent bitmap image data to device dependent bitmap image data if the application is authorized to display data at an interactive display device and displaying the device dependent bitmap image data at the interactive display device.

Example 30 includes the subject matter of Example 29 and wherein determining if the application is authorized to display data at the interactive display device comprises receiving a permission request from the application to display data at the interactive display device prior to receiving the display independent bitmap image data from an application and accessing a permission list to determine if the application has been approved to display data at an interactive display device.

Example 31 includes the subject matter of Example 30 and comprising further instructions that in response to being executed on a computing device, causes the computing device to carry out operations comprising enabling the application to display data at the interactive display device if the application has been approved to display data at an interactive display device.

Example 32 includes the subject matter of Example 30 and comprising further instructions that in response to being executed on a computing device, causes the computing device to carry out operations comprising displaying a prompt at the interactive display device for a user to select options to approve or disapprove the device if the application is not included on the permission list and communicating the option to the application.

Example 33 includes the subject matter of Example 29 and wherein the application is a location based application to display a first image at the interactive display device if a computer system is located at a first location and to display a second image at the interactive display device if computer system is located at a second location.

Example 34 includes the subject matter of Example 33 and wherein the location based application tags the first image to be associated with the first location and tags the second image to be associated with the second location.

Example 35 includes the subject matter of Example 34 and wherein tagging an image comprises selecting a location to be associated with the image.

Example 36 includes the subject matter of Example 35 and wherein the location is selected by designating global positioning system (GPS) coordinates of the first and second locations.

Example 37 includes the subject matter of Example 35 and wherein the location is selected by determining a location of the computer system during tagging of first image.

Example 38 includes the subject matter of Example 35 and wherein displaying an image at the interactive display device comprises detecting a current location of the computer system, matching the current location with a tagged location and displaying the tagged location.

Example 39 includes the subject matter of Example 29 and comprising further instructions that in response to being executed on a computing device, causes the computing device to carry out operations comprising persistently displaying the data at the interactive display device.

Some embodiments pertain to Example 40 that includes an apparatus comprising means for detecting that a media capture device is prepared to capture media data of a scene, means for capturing data associated with the scene, means for analyzing the scene data to identify and classify behavior of one or more objects in the scene and means for adjusting the media capture device based on the scene data analysis to optimize the capture of the media data.

Example 41 includes the subject matter of Example 40 and wherein determining if the application is authorized to display data at the interactive display device comprises receiving a permission request from the application to display data at the interactive display device prior to receiving the display independent bitmap image data from an application and accessing a permission list to determine if the application has been approved to display data at an interactive display device.

Example 42 includes the subject matter of Example 40 and further comprising means for enabling the application to display data at the interactive display device if the application has been approved to display data at an interactive display device.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A computing device comprising:
    a processor;
    a bus coupled to the processor;
    a graphics display device, coupled to the bus, to display graphics data;
    an interactive display device, coupled to the bus, to display bitmap image data;
    a manager module to manage the bitmap image data and transmit the bitmap image data to the interactive display device;
    a global positioning system (GPS) sensor to receive positioning data indicating a location of the computing device;
    the manager module is configured to:
        receive a first user input that triggers reading of first positioning data of the computing device, and then tag a first image with the first positioning data,
        receive second positioning data, and then tag a second image with the second positioning data of the computing device; and
    an application authorized to display data at the interactive display and the application select the first image data for display at the interactive display device based if the computing device is located at the first tagged location and the application selects the second image for display at the interactive display device if the computing device is located at the second tagged location.

2. The computing device of claim 1 wherein the interactive display device comprises:
    a controller to receive the bitmap image data; and
    a persistent display screen to display the bitmap image data.

3. The computing device of claim 2 wherein the persistent display screen is a touch screen.

4. The computing device of claim 3 wherein the interactive display device further comprises one or more buttons.

5. The computing device of claim 4 wherein the controller detects an event upon activation of a button or the touch screen and transmits the event to the manager module.

6. The computing device of claim 3 wherein the interactive display device is an Electronic Paper Display (EPD).

7. The computing device of claim 3 wherein the interactive display device is coupled to the bus via a wireless communications link.

8. The computing device of claim 3 wherein the graphics display device is mounted on a front side of the computing system and the interactive display device is mounted on a backside of the computing device.

9. The computing device of claim 3 wherein the interactive display device is located on a tablet device separate from the computing device.

10. The computing device of claim 1 wherein the manager module manages requests from one or more applications to display data at the interactive display device.

11. The computing device of claim 10 wherein the manager module comprises a graphical user interface to prompt and receive user interaction to approve the requests from the one or more applications to display data at the interactive display device.

12. The computing device of claim 11 wherein the manager module further comprises a permission list of the applications approved and disapproved to display data at the interactive display device.

13. A computer generated method for displaying data at a secondary display, interactive display device of a computer system comprising:
receiving first and second display independent bitmap image data from a location based application;
in response to determining that the application is authorized to display data at an interactive display device of the computer system;
rendering each of the first and second independent bitmap image data to first and second device dependent bitmap image data (first image and second image, respectively);
receiving a first user input that triggers reading of first location data of the computer system, and then tagging the first image with the first location data;
receiving a second user input that triggers reading of second location data of the computer system, and then tagging the second image with the second location data;
displaying the first image at the interactive display device if the computer system is located at the first tagged location and displaying the second image at the interactive display device if the computer system is located at the second tagged location.

14. The method of claim 13 wherein determining if the application is authorized to display data at the interactive display device comprises:
receiving a permission request from the application to display data at the interactive
display device prior to receiving the display independent bitmap image data from an application; and
accessing a permission list to determine if the application has been approved to display data at an interactive display device.

15. The method of claim 14 further comprising enabling the application to display data at the interactive display device if the application has been approved to display data at an interactive display device.

16. The method of claim 14 further comprising:
displaying a prompt at the interactive display device for a user to select options to approve or disapprove the device if the application is not included on the permission list; and
communicating the option to the application.

17. The method of claim 16 wherein the location based application tags the first image to be associated with the first location and tags the second image to be associated with the second location.

18. A machine-readable medium comprising a plurality of instructions that in response to being executed on a computing device, causes the computing device to carry out operations comprising:
receiving first and second display independent bitmap image data from an application;
in response to determining that the application is authorized to display data at an interactive display device:
rendering each of the first and second independent bitmap image data to first and second device dependent bitmap image data (first image and second image, respectively)
receiving a first user input that triggers reading of first location data of the computer system, and then tagging the first image with the first location data;
receiving a second user input that triggers reading of second location data of the computer system, and then tagging the second image with the second location data;
displaying the first image at the interactive display device if the computing device is located at the first tagged location and displaying the second image at the interactive display device if computing device is located at the second tagged location.

19. The machine-readable medium of claim 18 wherein determining if the application is authorized to display data at the interactive display device comprises:
receiving a permission request from the application to display data at the interactive display device prior to receiving the display independent bitmap image data from an application; and
accessing a permission list to determine if the application has been approved to display data at an interactive display device.

20. The machine-readable medium of claim 19 comprising further instructions that in response to being executed on a computing device, causes the computing device to carry out operations comprising enabling the application to display data at the interactive display device if the application has been approved to display data at an interactive display device.

21. The machine-readable medium of claim 19 comprising further instructions that in response to being executed on a computing device, causes the computing device to carry out operations comprising:
displaying a prompt at the interactive display device for a user to select options to approve or disapprove the device if the application is not included on the permission list; and communicating the option to the application.

22. The machine-readable medium of claim 18 wherein the location based application tags the first image to be associated with the first location and tags the second image to be associated with the second location.

23. The machine-readable medium of claim 18, wherein obtaining first location information, second location information, and current location information is performed using components that form a part of the computing system.

* * * * *